United States Patent [19]

Bone et al.

[11] 4,273,788
[45] Jun. 16, 1981

[54] BULK PACKAGED MIXTURE OF HARD AND SOFT PET FOODS

[75] Inventors: David P. Bone, Palatine; Lynda Robleski, Skokie, both of Ill.

[73] Assignee: The Quaker Oats Company, Chicago, Ill.

[21] Appl. No.: 86,549

[22] Filed: Oct. 19, 1979

[51] Int. Cl.³ .................. B65B 23/00; B65B 25/06; A23K 1/00

[52] U.S. Cl. .................... 426/104; 426/106; 426/392; 426/802; 426/805; 426/623; 426/630

[58] Field of Search ............... 426/805, 106, 115, 119, 426/120, 128, 410, 413, 392, 92, 94, 96, 517, 559, 560, 104, 802, 623, 630

[56] References Cited

U.S. PATENT DOCUMENTS

| | | | |
|---|---|---|---|
| 3,148,962 | 9/1964 | Dellinger et al. | 210/290 |
| 3,202,514 | 8/1965 | Burgess et al. | 426/805 |
| 3,365,297 | 1/1968 | Burgess et al. | 426/635 |
| 3,380,832 | 4/1968 | Bone | 426/272 |
| 3,467,525 | 9/1969 | Hale | 426/805 |
| 3,734,295 | 5/1973 | Smith et al. | 210/290 |
| 3,883,672 | 5/1975 | Bone et al. | 426/805 |
| 3,959,511 | 5/1976 | Balaz et al. | 426/805 |
| 3,962,462 | 6/1976 | Burkwall et al. | 426/805 |
| 4,006,266 | 2/1977 | Bowe et al. | 426/635 |
| 4,011,345 | 3/1977 | Bartsch | 426/805 |
| 4,039,689 | 8/1977 | Bone | 426/805 |
| 4,190,679 | 2/1980 | Coffee et al. | 426/805 |

Primary Examiner—Steven L. Weinstein
Attorney, Agent, or Firm—Joseph P. O'Halloran

[57] ABSTRACT

A bulk package of a mixture of hard and soft pet food results in no chunking and no product separation when the hard pet food is provided in bite size pieces having at least two large dimensions and the soft pet food is present in the form of slender strands having a length between 1.4 and 3.0 times the largest dimension of the dry pet food pieces.

15 Claims, 3 Drawing Figures

10

20

10  20  30

BULK PACKAGED MIXTURE OF HARD AND SOFT PET FOODS

BACKGROUND OF THE INVENTION

This invention relates to pet food, and more particularly to bulk packaged mixtures of hard and soft pet food in which the hard pieces are of the "dry" pet food type, and the soft pieces are either "dry" or "semi-moist" pet food.

Within the class of pet foods, there are three basic categories: (1) dry pet food; (2) semi-moist pet food; and (3) moist pet food.

Generally speaking, each pet food of a particular category differs from the other pet food categories in that different packaging techniques are required and different palatability levels are achieved. The dry pet food contains the least amount of moisture and is the most stable. Therefore, the dry pet food requires the least sophisticated packaging, and is the simplest to handle and store. Whereas the dry pet foods contain up to about 15 percent moisture by weight and are the most stable of the three classes of pet foods, the semi-moist pet food contains an intermediate range of moisture, namely about 15 to about 50 percent by weight moisture. The semi-moist pet food requires somewhat more sophisticated packaging than does the dry pet food, but does not have to be sterile at the time of packaging. The semi-moist pet foods do not require aseptic canning, and are stable when wrapped in a standard polyethylene package or other conventional package. The so-called moist pet foods contain more than about 50 percent by weight moisture and require aseptic canning conditions to stabilize the pet food for marketing purposes. The moist pet foods are generally rated as highly palatable and the semi-moist pet foods are generally speaking, rated as more palatable than the dry pet foods.

Hard, dry pet food, while being very stable and easiest to store and handle, and being particularly suitable for shipping, storing and feeding in large packages, e.g. for most economical maintenance of relatively large pets, for example, has been regarded heretofore, as not as palatable as the other classes of pet food. Thus, although dry pet food is very nutritional, in some cases it was not a particularly acceptable pet food to either the pet or the pet owner. Although proper nutrition is provided by the hard, relatively abrasive pet food, the pet does not necessarily accept this food due to the hard abrasive nature. Yet, in many cases, the hard abrasive nature is highly desirable for teeth cleaning characteristics in addition to the nutritional aspects, and ease of shipping and storing. Consequently, in spite of all its inherent advantages, it may be difficult to feed a hard dry pet food because of the palatability and other acceptance problems.

In a recent U.S. Pat. No. 4,039,689 issued to David Palmer Bone on Aug. 2, 1977, a highly nutritional soft dry pet food was disclosed. In another U.S. Pat. No. namely 4,006,266 issued on Feb. 1, 1977 to David Palmer Bone and Edward Leo Shannon, a process for making a dry pet food having a hard component and a soft component was disclosed. The soft dry pet foods have all the highly advantageous storing and handling characteristics of the hard dry pet foods, and yet have proven to be much more acceptable both to the pet and to the pet owners because of the greater palatability of the soft dry pet foods as compared to the hard dry pet foods. The disclosure in U.S. Pat. No. 4,006,266, although specifically directed to "dry" pet food, i.e. those having a moisture content less than 15 percent by weight and typically about 10 percent by weight, refers to the increased palatability resulting from providing mixtures of the hard and soft pet foods instead of products consisting solely of hard dry pieces.

The Bone and Shannon U.S. Pat. No. 4,006,266 discloses the admixing of pieces of soft meat-like dry dog food with pieces of hard dry pet food. In one embodiment, the 4,006,266 patent refers to the production of the soft component as a stranded or "burger form" but states that it is desirable to refrain from cutting the strands after extrusion, and to use the attrition prevailing during the blending of the soft component strands with the hard component pieces to effect the breakup of strands into shorter pieces.

The dry pet foods are most desirable and advantageous for use in the simple, economically packaged "large package" segment of the pet food market, e.g. that sold in bulk in 5, 10, 20, and 40 pound bags. Several serious problems have been experienced, however, in the distribution, marketing and use of bulk packaged combinations of hard and soft dry pet foods as heretofore described.

It has been found that when a mixture of bite-sized soft and hard pet foods were packaged, stored and shipped in such large bags (e.g. 5, 10, 20 or 40 pounds per bag) on pallets and the like, the compression due to weight of the product resulted in a tendency for the contents of the bags to undergo "chunking", that is, adhesion between the soft and hard pieces. This resulted in the formation of larger composite chunks and an undesirable diminishment of the free flowing, discrete-particle characteristic of the pet food. On the other hand, when, as taught in Bone U.S. Pat. No. 4,006,266 the long strands of the "burger form" are extruded onto a conveyor belt and are broken up by the blending of the soft component strands with the hard component pieces so much breakage results in substantial product separation. Uncontrolled breakage, and production of small fragments of the soft portion of the product results in a very serious tendency of the product mixture to separate with the smaller fragments migrating downwardly under the influence of gravity, vibration, and product movement.

Such separation of the hard and soft components of the mixture obviously destroys the integrity of the product concept, i.e. a relatively uniform mixture of the hard and soft pet food pieces.

An object of the present invention is to provide a product mixture of hard and soft pet foods suitable for bulk packaging, in which the hard pet food is of the "dry" category and the soft pet food can be selected from either the "dry" or "semi-moist" category, which product when packaged bulk, results in substantially no chunking, minimal breakup of pieces, and substantially no product separation.

SUMMARY OF THE INVENTION

These and other objects which will be apparent hereinafter are achieved, in accordance with the present invention, in a packaged pet food product comprising a closed package containing at least about five pounds of a mixture of discrete pieces of hard dry pet food and soft dry or semi-moist pet food, in which the hard dry food pieces are bite-size pieces, and the soft pet food pieces are slender strands, said strands being between 1.4 and 3.0 times greater in length than the largest nominal dimension of the hard dry pet food pieces, and wherein the soft pieces are present in an amount between about 10 percent to about 40 percent by weight inclusive based on the weight of the mixture.

In accordance with the preferred aspects of the present invention, the largest transverse dimension of the elongated strands of soft pet food are between about 0.15 and 0.25 times the largest dimension of the hard pet food pieces. Also, in accordance with preferred aspects of the present invention, the hard pieces are of the size generally characterized as "bite-sized" and have at least two large uniform dimensions with a largest dimension between 0.5 and 1 inch.

A preferred "bite-sized" piece has uniform dimensions of about 0.75 inches. Thus, in accordance with a most preferred embodiment of the present invention, the hard dry pieces are in the form of an expanded extrudate approximately ¾ inches in diameter cut to provide approximately ¾ inches in length, and the soft pieces are cut extrudate pieces of approximately 5/32 inches in diameter (±1/16 inch) of the well known "burger" type and having lengths between 1.0 and 2.0 inches, inclusive.

As used herein, the terms "at least two large uniform dimensions" are intended to mean that at least two of the dimensions, i.e. length, width, and thickness, or diameter and length, are the same or similar and are at least twice as large as the smallest dimension of the strands, preferably at least three times larger than the smallest dimension of the strands. Also, it should be made clear that having uniform dimensions does not mean the respective pieces are uniform. A piece that is extruded to a ¾ inch diameter, and cut in ¾ inch lengths at the extruder will naturally be extremely irregular in shape, and be roughly spherical in appearance, for example.

In a preferred aspect of the present invention, a packaged pet food is provided which contains a mixture of hard bite-size pet food pieces and elongated slender strands of soft pet food in which the elongated slender strands are present in an amount between about 15 percent and 30 percent, inclusive by weight of the mixture.

The illustrations and specific examples herein are provided for the purpose of illustrating the general nature of the invention, and not for the purpose of unduly limiting the invention. The invention is illustrated with the aid of the accompanying drawings in which.

Figure 1:
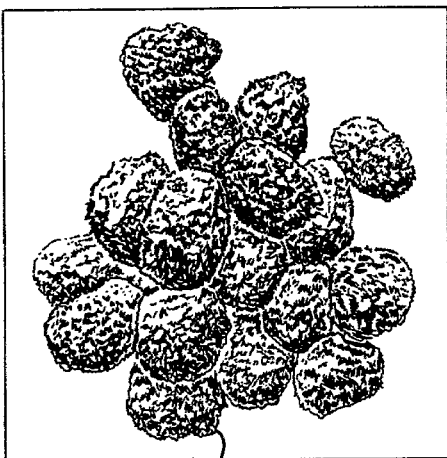
FIG. 1 is a top perspective view of bite sized hard dry pet food suitable for use in the invention.
Figure 2:
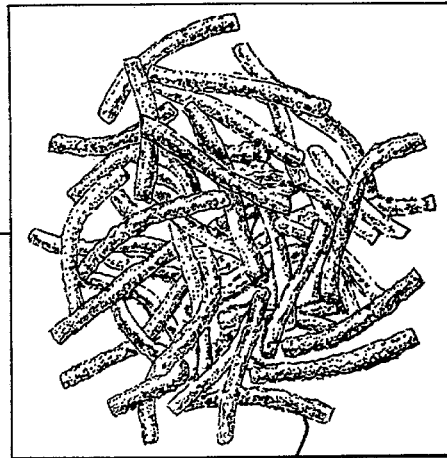
FIG. 2 is a top perspective view of the strands of soft dry pet food suitable for use in the invention.

In FIG. 1 a plurality of hard dry pet food pieces 10 are shown. Pieces 10 are expanded pieces produced in accordance with Example I herein, having relatively uniform dimensions, and being roughly spherical in shape. These are produced as ¾ inch diameter extrudate cut into ¾ inch lengths. In FIG. 2 a plurality of soft dry pet food pieces 20 are shown. These are produced in accordance with the procedure of Example I herein and have uniform diameters of 5/32 inches and respective pieces range in length from 1¼ inches to about 2 inches, most pieces being between 1½ and 1¾ inches long. Some variation within this range is believed to be the result of slight surging in the extrusion process.

Figure 3:
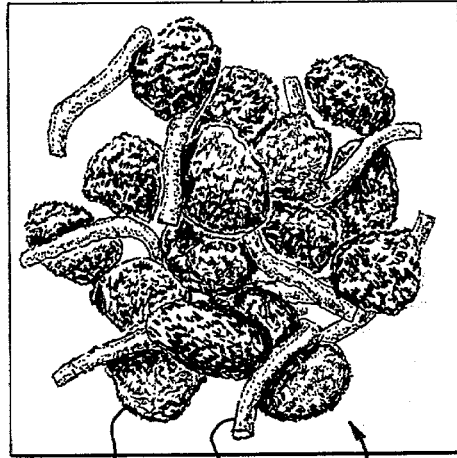
FIG. 3 is a top perspective view of a mixture of the hard and soft pieces as shown in FIGS. 1 and 2, which mixture is suitable for use in accordance with the invention.

In a preferred embodiment, the mixture 30 illustrated in FIG. 3, had 80 percent hard pieces 10, and 20 percent soft pieces 20. Mixture 30, in accordance with the present invention, is suitable for bulk packaging e.g. in 5, 10, 20, or 40 pound bags, or other large containers.

The soft pet food can be made in accordance with methods known in the art including the known methods for making semi-moist pet food e.g. the method disclosed in U.S. Pat. No. 3,202,514 to H. M. Burgess, or in U.S. Pat. No. 4,011,345 issued to A. G. Bartsch on Mar. 8, 1977.

The soft dry type pet foods for use in accordance with the present invention can be produced in accordance with any conventional process, for example, by the methods disclosed in U.S. Pat. No. 3,883,672 to D. P. Bone and E. L. Shannon on May 13, 1975, or in U.S. Pat. No. 3,039,689 issued to David Palmer Bone on Aug. 2, 1977, or disclosed in U.S. Pat. No. 4,006,266 issued to David Palmer Bone and E. L. Shannon on Feb. 1, 1977.

The hard pieces can also be made by any method known in the art including the methods disclosed in U.S. Pat. No. 3,467,525 to Douglas Hale, and R. J. Flier on Sept. 16, 1969, or in U.S. Pat. No. 4,006,266 to David Palmer Bone and Edward Leo Shannon on Feb. 1, 1977.

As indicated in the aforementioned U.S. Pat. No. 4,006,266 issued to David Palmer Bone and Edward Leo Shannon, it is highly desirable that the hard and soft components of any such pet food mixture have water activity in the range of 0.60 and 0.75 (defined in U.S. Pat. No. 3,380,832 to Bone, the definition of which is incorporated herein by reference). In such systems, the water transport between the hard and soft components is negligible inasmuch as, given a vapor-proof container, substantial equilibrium with the vapor phase is encountered.

In order to illustrate without unduly limiting the novel aspects of the present invention, the following examples are provided. In the examples percentages are by weight based on the total weight of the ingredients used in processing, unless otherwise indicated.

EXAMPLE I

Preparation of hard dry component (A)

Formula weights of ingredients as set forth in Table 1 except water are first blended in a suitable mixer such as a horizontal mixer for several minutes and then mixed with the formula weight of water in a continuous extrusion mixer or suitable device and the dough is passed through heating zones in an extruder so that the temperature of the dough upon extrusion is within the range of 250° to 320° F. Upon extrusion through a die the cooked dough expands due to the sudden release of pressure on a continuous basis to provide an extrudate approximately ¾ inches in diameter. High speed rotary knives moving across the face of the die cut the extrudate into lengths approximately ¾ inches in length. The resulting pieces are roughly spherical in appearance, though they are irregular in surface contour.

The total moisture level of the extrudate upon cutting ranges between about 20 percent and 30 percent, and the product is conveyed to a dryer which provides a multiple pass system and blows hot air up through the bottom of beds of the cut pieces. Drying is continued until the moisture level of 9–12 percent by weight is achieved.

Water activity of the stored product is determined to be in the range of 0.65–0.75 at a moisture content of about 12 percent.

To prevent growth of yeast and molds due to local condensation of moisture approaching or exceeding about 15 percent moisture in the product, it may be desirable to coat the product with a suitable mold inhibitor such as potassium sorbate or sorbic acid at a level of about 50–100 ppm.

TABLE 1

|  | A<br>Hard Dry Component<br>% by Weight | B<br>Soft Dry Component<br>% by weight |
|---|---|---|
| Amylaceous flour and meal | 58.10 | — |
| Sucrose | — | 26.21 |
| Modified soy protein isolate | — | 9.43 |
| Meat and bone meal | 10.42 | 8.79 |
| Defatted soy flour | 8.33 | 16.98 |
| Animal fat | 3.75 | 6.11 |
| Deflourinated phosphate | 2.08 | 4.26 |
| Iodized salt | 0.50 | 0.56 |
| Potassium chloride | — | 0.28 |
| Vitamin-mineral mix | 0.12 | 0.56 |
| Antioxidant | 0.01 | — |
| Food color | 0.01 | 0.04 |
| Propylene glycol | — | 7.55 |
| Carboxymethylcellulose | — | 0.37 |
| Water | 16.68 | 18.86 |
|  | 100.00 | 100.00 |

Preparation of soft dry component (B)

For each 100 pounds of dough to be prepared in connection with the preparation of the soft dry component, a sugar premix is made consisting of ingredients set forth in Table 2.

TABLE 2

|  | Lb. |
|---|---|
| Water | 18.86 |
| Propylene glycol | 2.83 |
| Carboxymethylcellulose | 0.37 |
| Sucrose | 26.21 |
|  | 48.27 |

The carboxymethylcellulose and propylene glycol are blended in a Waring blender and mixed with the water by stirring with a lightening mixer. The sucrose is then added during stirring.

The remainder of the formula ingredients set forth in Table 1 are mixed by blending the dry components in a horizontal mixer or a Sigma Blade Mixer, for about 1 minute, adding melted animal fat plus the remaining formula weight of propylene glycol, and continuing blending an additional 2 minutes, and finally adding the formula weight of sugar premix and blending 5 minutes. The mix is then fed into a screw extruder having a four inch diameter screw with a compression ratio of 5.228 a full pitched—profile 8 L/D for the feed section, 6 L/D for the transition section, and a profile of 12 L/D for the metering section, a flight depth of 1⅛ inches in the feed section and 0.225 inches in the metering section, RPM of screw is 30.5 and back pressure varied between 90 and about 115 psig. The production rate or throughput rate is about 450 pounds per hour. Steam jacket pressure for heating the extruder varies between 0 and about 20 psig on each of the four heating zones on the extruder. Extrudate temperatures range from about 215° to 280° F. with an average of about 253° F. The cooked extrudate leaving the extruder die is then discharged into a Hobart grinder fitted with a die plate consisting of multiplicity of 5/32 inch diameter holes which thereby form a multiplicity of continuous strands of product which are discharged into the air. High speed rotary knives passing along the face of the die plate are adjusted to cut the pieces at uniform lengths between 1.5 and 2 inches in length.

The water activity of the strands is found to be in the range 0.65–0.75 at a moisture content of 11–14 percent. The cut strands are then dropped to a conveyor, and continuously admixed by tumbling with hard component A in the ratio of about 80 parts of hard component to 30 parts of the soft component and the mixture is packaged in 10 pound bags having a polyethylene water vapor barrier liner.

EXAMPLE II

A ten pound bag of product produced in accordance with Example I is subjected to vibrating table tests, and the movement of the individual discrete particles within the bag is observed by opening the top of the bag. It is found that upon vibration, the strands tend to move upward along the outer walls of the bag and downwardly in the middle of the bag, along with the general mass of the dry hard pet food particles. The overall migration is observed to continue with substantially no breakage of the strands. Moreover, substantially no separation of the strands from the bite sized hard pieces is observed, in spite of the vibration, the strands appearing to migrate along with the dry hard particles in the overall movement within the bag during vibration. Similar product, except that the soft strands were pre-cut to lengths less than 1 inch, were found to result in significant product separation, and similar product, except that the strands were substantially longer than 3.0 times the largest dimension of the hard product pieces were found to encounter excessive breakage with component separation.

EXAMPLE III

Product produced in accordance with Example I is prepared for shipping by stacking a multiplicity of bags on top of one another on a standard shipping pallet. Even under shipping conditions and after prolonged vibration, no "clumping" is observed, and the product remains free-flowing having the originally observed discrete particle characteristics.

In addition, substantially no breakage is encountered, and the product maintains its integrity with respect to the continued random uniform distribution of the "burger-like" strands within the mass of dry hard "bite sized" pieces.

It is preferred that when bags are used as the package for the product of this invention, the bags include a vapor barrier such as a plastic film barrier.

Obviously, many modifications of this invention are possible and the examples are provided merely for the sake of illustrating the invention. It is understood, therefore, that this specification is intended to cover any variations, uses or adaptations of the invention regardless of the method by which the dry hard pieces are made, and regardless of the method by which the soft dry or semi-moist pieces are made, and any variations, uses or adaptations of the invention within the ranges set forth in this specification.

Having fully described and disclosed the invention, we claim:

1. A bulk packaged pet food product comprising a closed package containing a mixture of discrete pieces of hard dry pet food and soft dry or soft semi-moist pet food, in which the hard dry pet food pieces are roughly spherical bite-size pieces, and the soft pet food pieces consist essentially of slender cut burger strands, such strands being between 1.4 and three times greater in length than the largest dimension of the dry pet food pieces, the largest transverse dimension of the strands being between about 0.15 and 0.25 times the largest dimension of the hard, bite-size pieces, said large dimension of said bite-size pieces being between 0.5 and 1.0 inches, wherein the soft pieces are present in an amount between 10 and 40 percent by weight of the mixture.

2. The product of claim 1 in which the soft and hard pieces have a water activity in the range 6.0–7.5 inclusive.

3. A product of claim 1 in which the hard dry pieces are extrudate approximately ¾ inch in diameter by ¾ inch in length.

4. The product of claim 3 in which the soft pieces are 5/32±1/16 inch in diameter and 1½±¼ inch long.

5. The product of claim 1 in which the soft pieces are extrudate 5/32±1/16 inches in diameter.

6. A bulk packaged pet food product comprising a closed bag which includes a vapor barrier, said bag containing a mixture of discrete pieces of hard dry pet food and soft dry or soft semi-moist pet food, in which the hard dry pet food pieces consist essentially of roughly spherical bite-size piece of approximately uniform dimensions, and the soft pet food pieces are slender, cut burger strands, such strands being between 1.4 and three times greater in length than the largest dimension of the dry pet food pieces, said strands having a largest transverse dimension between about 0.15 and 0.25 times the largest dimension of the hard bite-size pieces, said largest dimension of said bite-size pieces being between 0.5 and 1.0 inches, wherein the soft pieces are present in an amount between 10 and 30 percent by weight of the mixture.

7. The product of claim 6 in which the soft and hard pieces have a water activity in the range 6.0–7.5 inclusive.

8. The product of claim 6 in which the hard dry pieces are extrudate approximately ¾ inches in diameter by ¾ inches in length.

9. The product of claim 8 in which the soft pieces are 5/32±1/16 inches in diameter and 1½±¼ inches long.

10. The product of claim 6 in which the soft pieces are extrudate 5/32±1/16 inches in diameter.

11. A bulk packaged pet food product comprising a closed bag which includes a vapor barrier, said bag containing a mixture of discrete pieces of hard dry pet food and soft dry or semi-moist pet food, in which the hard dry pet food pieces are roughly spherical bite-size pieces of approximately uniform dimensions, and the soft pet food pieces consist essentially of slender, cut burger strands, such strands being between 1.4 and three times greater in length than the largest dimension of the dry pet food pieces, said strands having a largest transverse dimension between about 0.15 and 0.25 times the largest dimension of the hard bite-size pieces, said largest dimension of said bite-size pieces being between 0.5 and 1.0 inches, wherein the soft pieces are present in an amount between 10 and 40 percent by weight of the mixture.

12. The product of claim 11 in which the soft and hard pieces have a water activity in the range 6.0–7.5 inclusive.

13. The product of claim 11 in which the hard dry pieces are extrudate approximately ¾ inch in diameter by ¾ inch in length.

14. The product of claim 13 in which the soft pieces are 5/32±1/16 inches in diameter and 1½±¼ inches in length.

15. The product of claim 11 in which the soft pieces are extrudate 5/32±1/16 inches in diameter.

* * * * *